United States Patent
Igarashi (10) Patent No.: US 11,828,602 B2
(45) Date of Patent: Nov. 28, 2023

(54) LOCATION ESTIMATING DEVICE, STORAGE MEDIUM STORING COMPUTER PROGRAM FOR LOCATION ESTIMATION AND LOCATION ESTIMATING METHOD

(71) Applicant: TOYOTA JIDOSHA KABUSHIKI KAISHA, Toyota (JP)

(72) Inventor: Ryo Igarashi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 17/344,273

(22) Filed: Jun. 10, 2021

(65) Prior Publication Data
US 2021/0389132 A1     Dec. 16, 2021

(30) Foreign Application Priority Data
Jun. 11, 2020   (JP) ................. 2020-101519

(51) Int. Cl.
| G01C 21/00 | (2006.01) |
| G01C 21/28 | (2006.01) |
| G06T 7/70 | (2017.01) |
| G06V 20/56 | (2022.01) |
| G06V 20/58 | (2022.01) |

(52) U.S. Cl.
CPC ............. *G01C 21/28* (2013.01); *G06T 7/70* (2017.01); *G06V 20/588* (2022.01); *G06T 2207/30256* (2013.01); *G06V 20/584* (2022.01)

(58) Field of Classification Search
CPC . G01C 21/28; G06T 7/70; G06T 2207/30256; G06V 20/588; G06V 20/584

USPC ......................................................... 701/445
See application file for complete search history.

(56) References Cited

U.S. PATENT DOCUMENTS

| 2017/0010618 | A1* | 1/2017 | Shashua ............... G01S 5/0027 |
| 2017/0082454 | A1* | 3/2017 | Jurk ...................... G01C 21/20 |
| 2018/0024568 | A1  | 1/2018 | Fridman |
| 2018/0284785 | A1* | 10/2018 | Berntorp ............ G06V 20/584 |
| 2019/0064826 | A1  | 2/2019 | Matsui |
| 2020/0056894 | A1  | 2/2020 | Kawabata |
| 2020/0110422 | A1  | 4/2020 | Takamatsu et al. |

FOREIGN PATENT DOCUMENTS

| JP | 2018-96743    | 6/2018 |
| JP | 2019-11054 A  | 1/2019 |
| JP | 2019-39831 A  | 3/2019 |

(Continued)

*Primary Examiner* — Tyler J Lee
*Assistant Examiner* — Tiffany P Ohman
(74) *Attorney, Agent, or Firm* — Sughrue Mion, PLLC (57) ABSTRACT

A location estimating device has a processor that is configured to calculate a first estimated location of a vehicle using positional information representing the location of a vehicle and first map data overlapping with a first section of a vehicle traveling route, to calculate a second estimated location of the vehicle using positional information and second map data that overlaps with a second section of the traveling route, the first section and the second section having an overlapping section, and to assess whether or not the precision of the second estimated location satisfies a predetermined assessment criterion when the vehicle is traveling in the overlapping section from the first section toward the second section.

8 Claims, 7 Drawing Sheets

(56) References Cited

FOREIGN PATENT DOCUMENTS

| | | |
|---|---|---|
| JP | 2019-45212 A | 3/2019 |
| JP | 2019-525148 A | 9/2019 |
| JP | 2019-179421 A | 10/2019 |
| WO | 2018/189843 A1 | 10/2018 |

* cited by examiner

LOCATION ESTIMATING DEVICE, STORAGE MEDIUM STORING COMPUTER PROGRAM FOR LOCATION ESTIMATION AND LOCATION ESTIMATING METHOD

FIELD

The present invention relates to a location estimating device, a storage medium that stores a computer program for location estimation and a location estimating method.

BACKGROUND

High precision map data that is referred to by a vehicle self-driving system for control of vehicle travel does not always necessarily include the entire traveling route of the vehicle. For example, a vehicle self-driving system often uses data from multiple maps while traveling on the traveling route from the current location of the vehicle to the destination.

In the operation control device proposed in International Patent Publication No. 2018/189843, for example, when a vehicle is traveling on a first route in a first map MP1 among multiple routes, first operation control is carried out, once it has been estimated that the current location of the vehicle is within the first map MP1. The operation control device also carries out second operation control, when a vehicle is traveling on a second route in a second map MP2 among multiple routes, once it has been estimated that the current location of the vehicle is within the second map MP2.

SUMMARY

When a vehicle self-driving system uses data from multiple maps, it switches road maps used for control of the vehicle during travel on the traveling route. While the map data is being switched, there is no assessment of whether or not the location of the vehicle is estimated to adequate precision in the switched map data.

It is therefore an object of the present invention to provide a location estimating device that can assess, before switching map data, whether the map data after switching can be used to precisely estimate the location of the vehicle.

One embodiment of the invention provides a location estimating device. The location estimating device has a location calculating unit which calculates a first estimated location of a vehicle using positional information representing the location of the vehicle and first map data overlapping with a first section of a vehicle traveling route, and calculates a second estimated location of the vehicle using the positional information and second map data that overlaps with a second section of the traveling route, the first section and the second section having an overlapping section and an assessment unit which assesses whether or not the precision of the second estimated location satisfies a predetermined assessment criterion when the vehicle is traveling in the overlapping section from the first section toward the second section.

In this location estimating device, it is preferred that the location calculating unit determines the mean and variance of the location of the vehicle estimated using a particle filter when the vehicle is traveling in the overlapping section, obtaining the mean of the location of the vehicle as the second estimated location, and the assessment unit assesses that the precision of the second estimated location satisfies the predetermined assessment criterion when the variance of the location of the vehicle is below a first reference value.

In this location estimating device, it is preferred that the location calculating unit further determines the variance of the traveling direction of the vehicle estimated using the particle filter when the vehicle is traveling in the overlapping section, and the assessment unit assesses that the precision of the second estimated location satisfies the predetermined assessment criterion when the variance of the location of the vehicle is below a first reference value and the variance of the traveling direction of the vehicle is below a second reference value.

In this location estimating device, it is preferred that the location calculating unit determines first road information representing the road on which the vehicle is traveling and first lane information representing the location of the traffic lane of the road on which the vehicle is traveling, based on the positional information, the first estimated location and the first map data when the vehicle is traveling in the overlapping section, and determines second road information representing the road on which the vehicle is traveling and second lane information representing the location of the traffic lane of the road on which the vehicle is traveling, based on the positional information, the second estimated location and the second map data, and the assessment unit assesses that the precision of the estimated location of the vehicle satisfies the predetermined assessment criterion when the first road information and second road information coincide and the first lane information and second lane information coincide.

In this location estimating device, it is preferred that the assessment unit determines the first estimated location to be the estimated location of the vehicle when the precision of the second estimated location does not satisfy the predetermined assessment criterion, and which further has a switching unit which causes the location calculating unit to switch the map data used for calculation of the estimated location of the vehicle from the first map data to the second map data, when the precision of the second estimated location satisfies the predetermined assessment criterion.

In this location estimating device, it is preferred that the switching unit causes the location calculating unit to assess whether or not the distance between the second estimated location and the center line of the traffic lane in which the vehicle is traveling in the second map data is below a reference distance, when the precision of the second estimated location satisfies the predetermined assessment criterion, and to switch the map data used for calculation of the estimated location of the vehicle front the first map data to the second map data when the distance is below the reference distance, or to not switch the map data used for calculation of the estimated location of the vehicle from the first map data to the second map data when the distance is not below the reference distance.

According to one embodiment there is provided a computer program for location estimation. The computer program for location estimation causes the processor to calculate a first estimated location of a vehicle using positional information representing the location of the vehicle and first map data overlapping with a first section of a vehicle traveling route, and calculate a second estimated location of the vehicle using the positional information and second map data that overlaps with a second section of the traveling route, the first section and the second section having an overlapping section; and assess whether or not the precision of the second estimated location satisfies a predetermined assessment criterion when the vehicle is traveling in the overlapping section from the first section toward the second section.

According to one embodiment there is provided a location estimating method. In the location estimating method, a location estimating device executes to calculate a first estimated location of a vehicle using positional information representing the location of the vehicle and first map data overlapping with a first section of a vehicle traveling route, and calculate a second estimated location of the vehicle using the positional information and second map data that overlaps with a second section of the traveling route, the first section and the second section having an overlapping section and assess whether or not the precision of the second estimated location satisfies a predetermined assessment criterion when the vehicle is traveling in the overlapping section from the first section toward the second section.

The location estimating device of the invention exhibits an effect whereby it can assess, before switching map data, whether or not the map data after switching can be used to precisely estimate the location of the vehicle.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
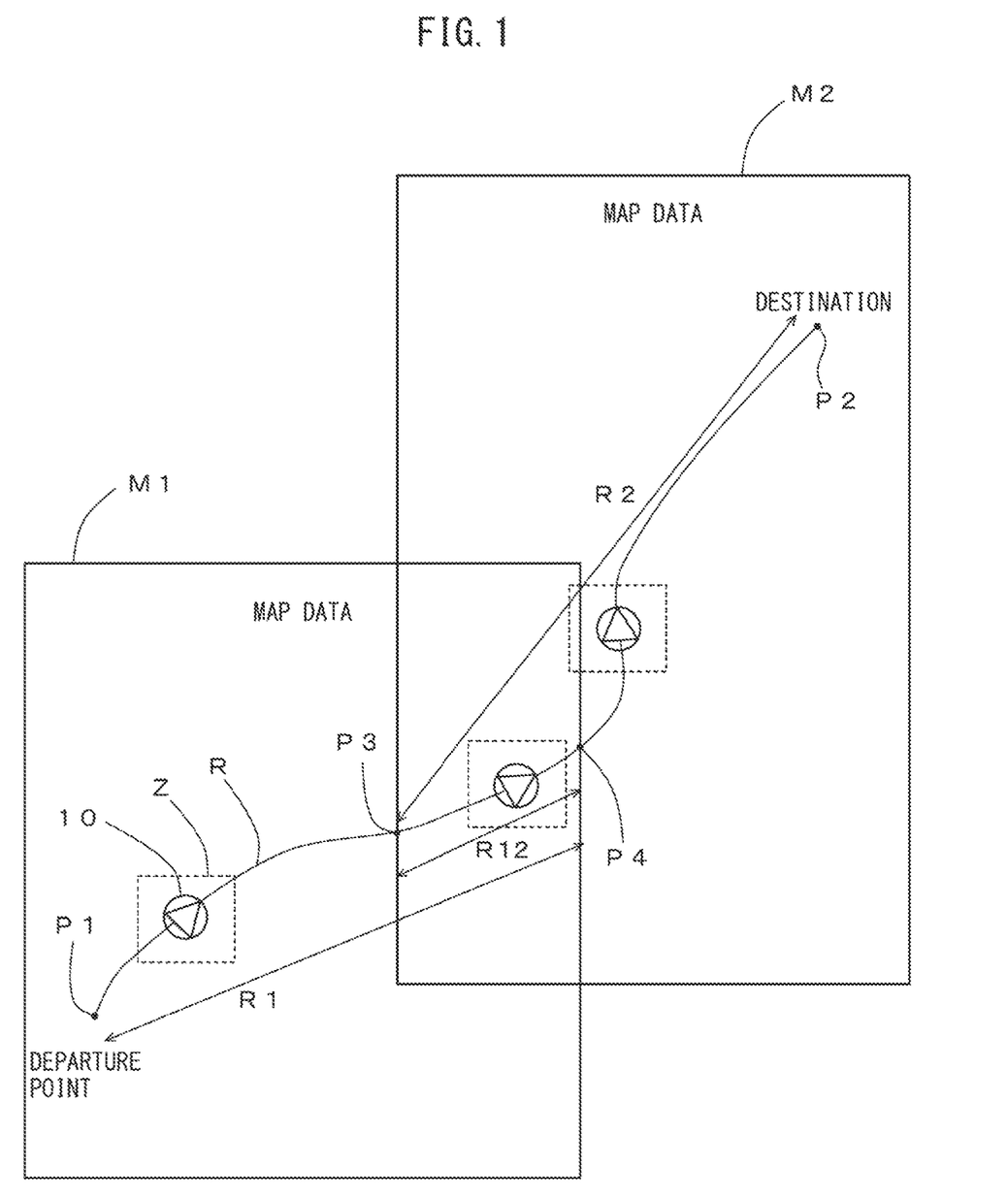
FIG. 1 is a diagram showing an example of a traveling route and map data.

FIG. 1 is a diagram showing an example of a vehicle traveling route and map data. Operation of the vehicle control system in the vehicle 10 according to the first embodiment, in which a location estimating device is mounted, will now be described in overview with reference to FIG. 1. The traveling route R of the vehicle 10 includes a route from a departure point P1 to a destination P2. The first section R1 of the traveling route R overlaps with map data M1 stored in the vehicle control system. The second section R2 of the traveling route R overlaps with map data M2 stored in the vehicle control system. The map data M1 and map data M2 are partially overlapping, with the first section R1 and second section R2 of the traveling route R having an overlapping section R12 included in both the map data M1 and map data M2.

When the vehicle 10 is traveling in the first section R1 of the traveling route R which does not include the overlapping section R12, the location estimating device calculates the estimated location of the vehicle 10 using positional information representing the location of the vehicle 10, and the map data M1. The positional information used may be a camera image taken of the environment surrounding the vehicle 10, for example.

When the vehicle 10 is traveling on the overlapping section R12, the location estimating device calculates the first estimated location of the vehicle 10 using the positional information and the map data M1, and calculates the second estimated location of the vehicle 10 using the positional information and the map data M2. While the vehicle 10 is traveling in the overlapping section R12, the location estimating device assesses whether or not the precision of the second estimated location of the vehicle 10 satisfies a predetermined assessment criterion. The location estimating device uses the first estimated location calculated using the map data M1 as the estimated location of the vehicle 10 until the precision of the second estimated location of the vehicle 10 satisfies the predetermined assessment criterion. When the precision of the second estimated location of the vehicle 10 has satisfied the predetermined assessment criterion, the location estimating device switches the map data used for calculation of the estimated location of the vehicle 10 from the first map data to the second map data. In the remaining overlapping section R12, the location estimating device then calculates the estimated location of the vehicle 10 using the positional information and the map data M2.

When the vehicle 10 is traveling in the second section R2 of the traveling route R which does not include the overlapping section R12, the location estimating device calculates the estimated location of the vehicle 10 using positional information representing the location of the vehicle 10, and the map data M2.

When the location estimating device calculates the estimated location of the vehicle using the positional information and the new map data, it may not be possible to precisely estimate the location of the vehicle at first. This may be due to abnormalities in the camera image used as the positional information, or problems with the positioning information used as the initial value for estimation of the estimated location of the vehicle.

In the overlapping section R12 of the traveling route R between the first map data and second map data, therefore, the location estimating device of this embodiment confirms that the precision of the second estimated location of the vehicle 10 satisfies the predetermined assessment criterion. Before switching map data, therefore, the location estimating device assesses whether or not the map data after switching can be used to precisely estimate the location of the vehicle. After having confirmed that the precision of the second estimated location of the vehicle 10 satisfies the predetermined assessment criterion, the location estimating device may switch the map data used for calculation of the estimated location of the vehicle 10 from the first map data to the second map data, thus allowing precise assessment of the location of the vehicle even after switching the map data.

Figure 2:
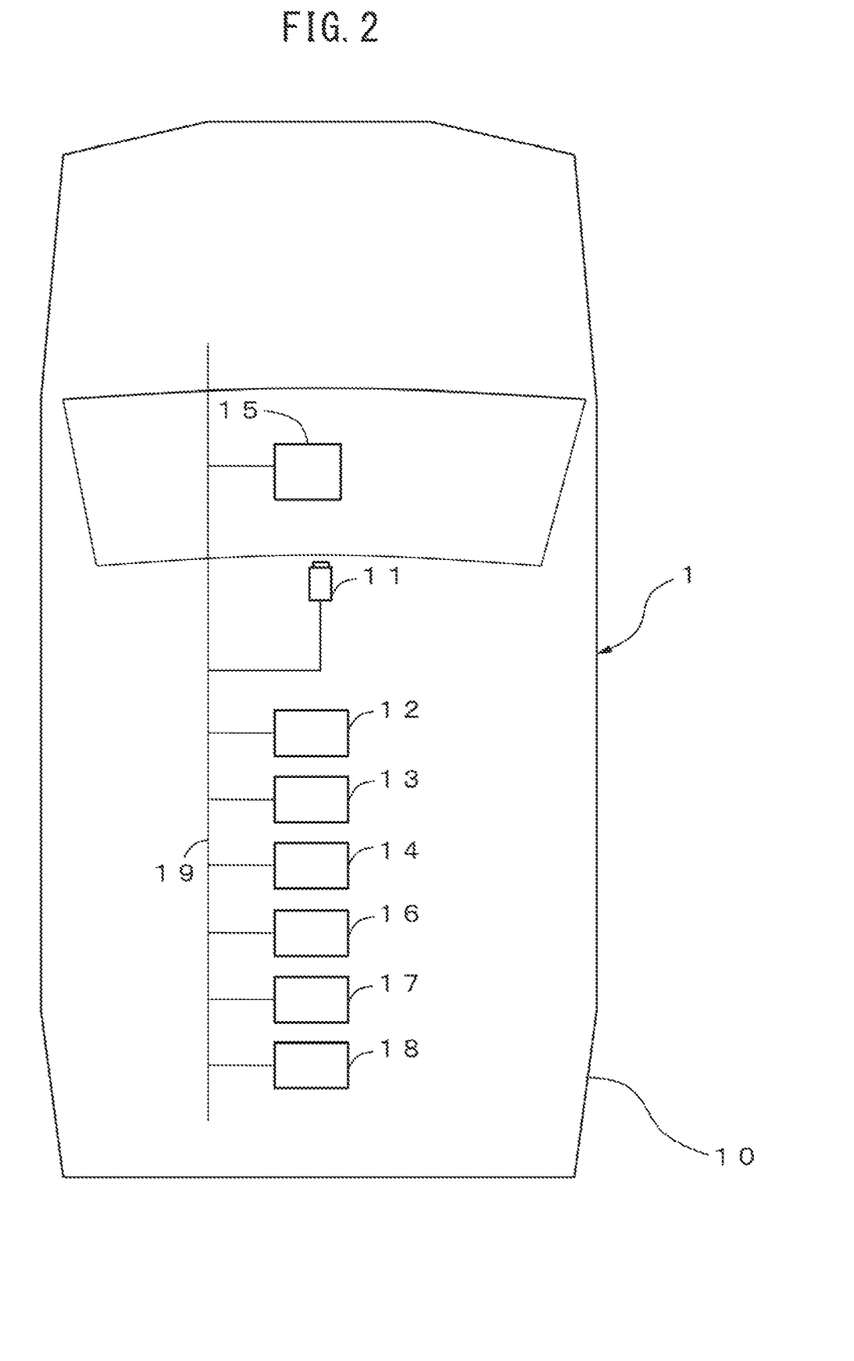
FIG. 2 is a general schematic drawing of a vehicle control system according to a first embodiment, which is equipped with a location estimating device.
Figure 3:
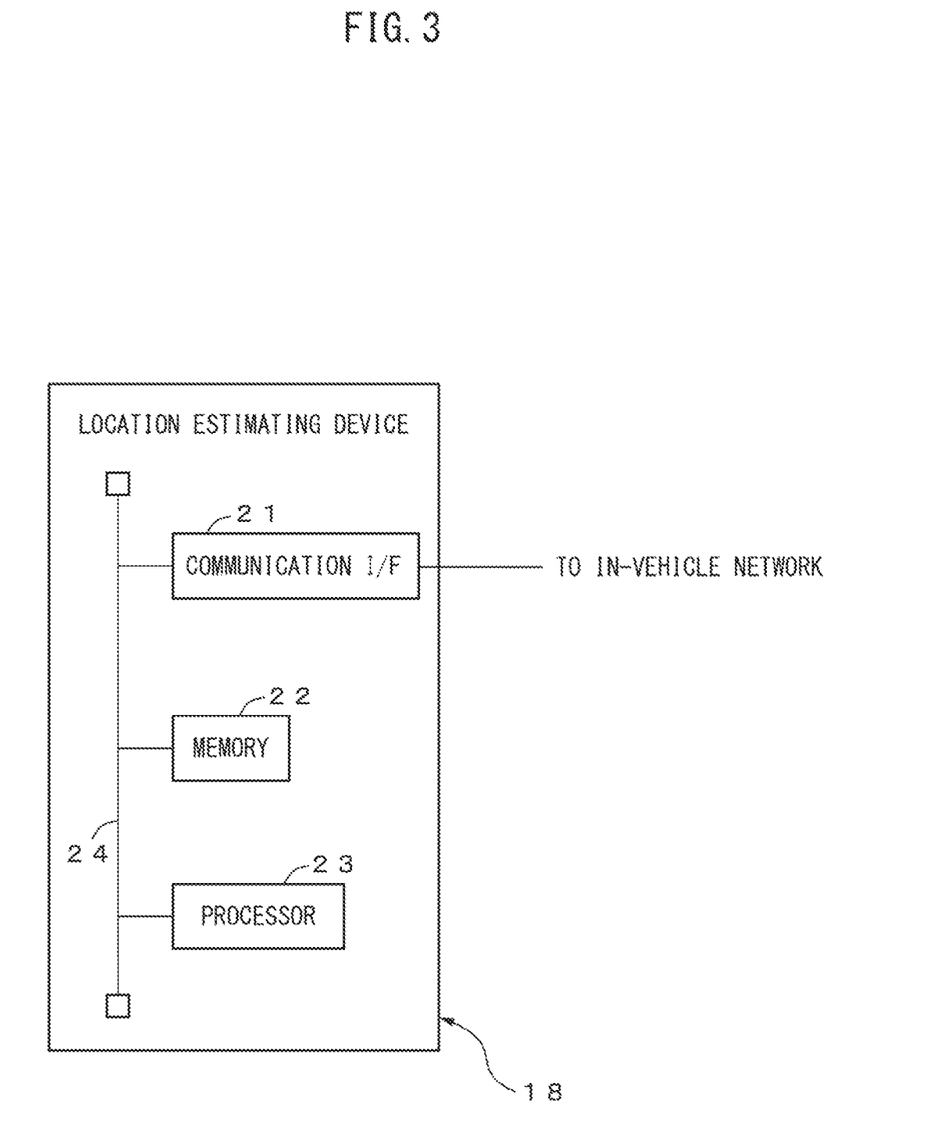
FIG. 3 is a hardware configuration diagram of a location estimating device.

A vehicle control system in which the location estimating device is mounted will now be further explained with reference to the accompanying drawings. FIG. 2 is a general schematic drawing of a vehicle control system according to the first embodiment, which is equipped with a location estimating device. FIG. 3 is a hardware configuration diagram of a location estimating device.

For this embodiment, the vehicle control system 1 that is mounted in the vehicle 10 and controls the vehicle 10 comprises a camera 11 that photographs the environment ahead of the vehicle 10, a positioning information receiver 12, a map data storage device 13, a navigation device 14, a user interface (UI) 15, an object detector 16, a vehicle control device 17 and a location estimating device 18.

The camera 11, positioning information receiver 12, map data storage device 13, navigation device 14, (UI) 15, object detector 16, vehicle control device 17 and location estimating device 18 are connected in a communicable manner through an in-vehicle network 19 that conforms to controller area network standards. The vehicle 10 may also have a LiDAR sensor, as a distance sensor (not shown) for measurement of the distance of the vehicle 10 to surrounding objects.

The camera 11, as an example of an imaging unit, is mounted inside the compartment of the vehicle 10 and directed toward the front of the vehicle 10. The camera 11 produces a camera image in which a predetermined region ahead of the vehicle 10 is shown at a camera image acquisition time set with a predetermined cycle. The camera image that is produced shows other vehicles or road features such as road surface lane marking lines that are within a predetermined region ahead of the vehicle 10. The image produced by the camera 11 may be a color image or a gray image. The camera 11 has a 2D detector composed of an array of photoelectric conversion elements with visible light sensitivity, such as a CCD or C-MOS, and an imaging optical system that forms an image of the photographed region on the 2D detector. Each time a camera image is produced, the camera 11 outputs the camera image and the camera image acquisition time during which the camera image was produced, through the in-vehicle network 19 to the object detector 16 and location estimating device 18. At the object detector 16, the camera image is used for processing to detect other objects surrounding the vehicle 10. The camera image is also used for processing at the location estimating device 18 to estimate the current location of the vehicle.

The positioning information receiver 12 outputs positioning information that represents the current location of the vehicle 10. The positioning information receiver 12 may be a GPS receiver, for example. Via the in-vehicle network 19, the positioning information receiver 12 outputs positioning information and the positioning information acquisition time at which the positioning information has been acquired, to the map data storage device 13, navigation device 14 and location estimating device 18, each time positioning information is acquired at a predetermined receiving cycle.

The map data storage device 13 stores data for multiple maps to be used to estimate the location of the vehicle 10. The map data among the multiple map data that represents adjacent regions are partially overlapping in their regions represented by the map data. The map data storage device 13 stores the map identifying information representing each of the multiple map data items, and the information representing the regions represented in each of the multiple map data items. Specifically, the map data contains the locations and types of road features (such as lane marking lines, stop Lines, speed indicators and other road markings, road signs or traffic lights) that define the traveling conditions for each road represented on the map. The location of the road feature is represented by the world coordinate system, with a predetermined reference location in real space as the origin. The map data may also contain information related to traffic regulations, information related to accidents, information related to other vehicles or pedestrians, and information related to signals. Each of the road features in the map data are associated with a traffic lane ID, as identifying information for identification of the traffic lane on the road. The traffic lane ID is associated with a road zone ID as identifying information for identification of the road zone. When one road zone has multiple traffic lanes, the multiple traffic lane IDs are associated with that road zone ID. The map data storage device 13 receives and stores each of the map data items from an external server via a base station, by wireless communication through a wireless communication device (not shown).

Each time positioning information is input from the positioning information receiver 12 or each time the previous estimated location of the vehicle 10 is input, the map data storage device 13 refers to the map data selected by the location estimating device 18, and outputs the map information for a predetermined region (in a range of 100 m$^2$ to 10 km$^2$, for example) including the current location represented by the positioning information or the previous estimated location, to the object detector 16, vehicle control device 17 and location estimating device 18 via the in-vehicle network 19. In FIG. 1, a map region Z represented by map information is outlined with a dot and dash line.

The navigation device 14 produces a traveling route from the current location of the vehicle 10 to the destination, based on navigating map data, the destination of the vehicle 10 and the current location of the vehicle 10. The navigating map data includes road link positional information representing the road zone, and positional information of nodes that are connected by the road links. The road configuration on the traveling route is represented by road links representing the road zones, and nodes connected by the road links. Every time a traveling route is produced, the navigation device 14 outputs the traveling route to the vehicle control device 17 and location estimating device 18 via the in-vehicle network 19.

The UI 15, as an example of a notification unit, is controlled by the vehicle control device 17 to notify the driver of traveling information for the vehicle 10, while producing an operation signal in response to operation of the vehicle 10 by the driver. The traveling information of the vehicle 10 includes information relating to the current location of the vehicle and the traveling route. The UI 15 has a liquid crystal display or touch panel, for example, as a notification device for notifying the driver of traveling information. The UI 15 also has a touch panel or operating button, for example, as an input device for inputting operation information from the driver to the vehicle 10. The UI 15 receives traveling information from the vehicle control device 17 via the in-vehicle network 19, and sends an operation signal produced in response to operation by the driver to the vehicle control device 17 via the in-vehicle network 19.

The object detector 16 detects other objects around the vehicle 10, and their type, based on the camera image. Other objects also include other vehicles traveling around the vehicle 10, The object detector 16 detects objects represented in the camera image, by inputting the image into a discriminator, for example. The discriminator may use a deep neural network (DNN) that has been trained to detect objects represented in input images, for example. The object detector 16 outputs information relating to the types of other objects (such as vehicles) that have been detected, to the vehicle control device 17 via the in-vehicle network 19. All or some of the functions of the object detector 16 are carried oat by functional modules driven by a computer program operating on the processor, for example. Alternatively, all or some of the functions of the object detector 16 may be carried out by special computing circuits.

Based on information relating to other objects detected by the object detector 16, the vehicle control device 17 tracks and estimates the future trajectory of those other objects. Based on the traveling route of the vehicle 10 generated by the navigation device 14, the map data stored in the map data storage device 13, the future trajectory of other objects as estimated by the vehicle control device 17, and the estimated location and estimated direction of the vehicle 10, the vehicle control device 17 produces a driving plan for the vehicle 10, maintaining a prescribed distance between the vehicle 10 and other objects. The vehicle control device 17 also produces a control signal based on the driving plan. The vehicle control device 17 sends the control signal via the in-vehicle network 19 to an actuator (not shown) that controls the steering wheel of the vehicle 10, a drive unit (not shown) such as the engine of the vehicle 10, or the brake (not shown). All or some of the functions of the vehicle control device 17 are carried out by functional modules driven by a computer program operating on the processor, for example. Alternatively, all or some of the functions of the vehicle control device 17 may be carried out by special computing circuits.

The location estimating device 18 carries out location estimation processing in which the estimated location of the vehicle 10 is calculated. For this purpose, the location estimating device 18 has a communication interlace 21, a memory 22 and a processor 23. The communication interface 21, memory 22 and processor 23 are connected in a communicable manner via a bus 24.

The communication interface (I/F) 21 is an example of a communication unit, and it has an interface circuit to connect the location estimating device 18 to the in-vehicle network 19. Specifically, the communication interface 21 is connected with the camera 11, the positioning information receiver 12 and the map data storage device 13 via the in-vehicle network 19. Each time a camera image and a camera image acquisition time are received from the camera 11, for example, the communication interface 21 passes the received camera image and camera image acquisition time to the processor 23. In addition, each time positioning information and positioning information acquisition time are received from the positioning information receiver 12, the communication interface 21 passes the received positioning information and positioning information acquisition time to the processor 23. In addition, each time map information is received from the map data storage device 13, the communication interface 21 passes the received map information to the processor 23.

The memory 22 is an example of a memory unit, and it has a volatile semiconductor memory and a non-volatile semiconductor memory, for example. The memory 22 stores various data to be used in location estimation processing carried out by the processor 23 of the location estimating device 18, installation location information such as the optical axis direction and mounting position of the camera 11, and internal parameters such as the focal length and viewing angle of the imaging optical system. The memory 22 also stores the map identifying information representing each of the multiple map data items, and the information representing the regions represented in each of the multiple map data items, which are stored by the map data storage device 13. The memory 22 additionally stores the camera image and camera image acquisition time received from the camera 11, the positioning information and positioning information acquisition time received from the positioning information receiver 12, and the map information read in from the map data storage device 13.

The processor 23 comprises one or more CPUs (Central Processing Units) and their peripheral circuits. The processor 23 may also have other computing circuits such as a logical operation unit, numerical calculation unit or graphic processing unit. When the processor 23 has multiple CPUs, it may have a separate memory for each CPU. The processor 23 stores in the memory 22 the image and camera image acquisition time received from the camera 11, the positioning information and positioning information acquisition time received from the positioning information receiver 12, and the traveling route received from the navigation device 14. The processor 23 carries out location estimation processing.

Figure 4:
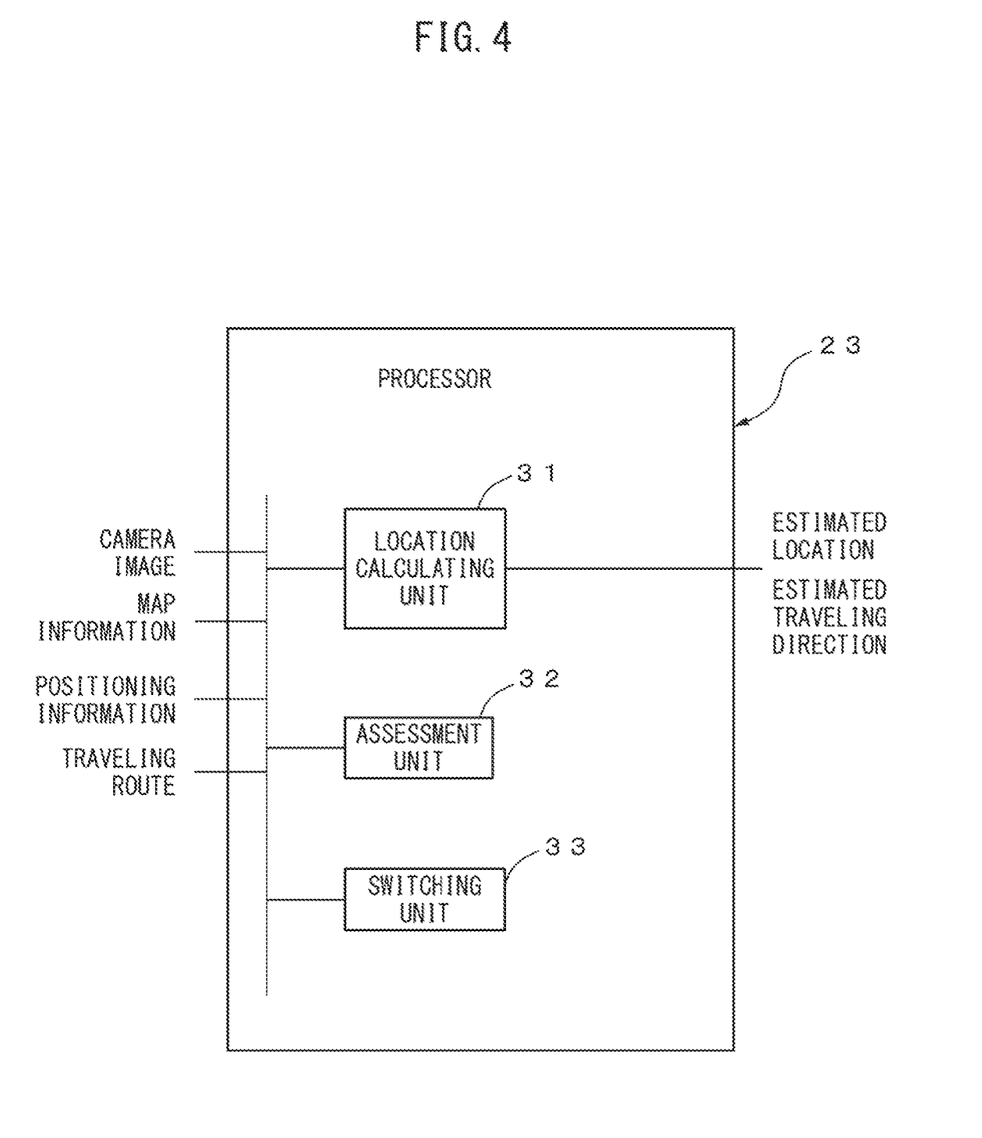
FIG. 4 is a functional block diagram of a processor of a location estimating device in a vehicle control system according to the first embodiment.

FIG. 4 is a functional block diagram of a processor of a location estimating device 18 in the vehicle control system 1 according to the first embodiment. The processor 23 has a location calculating unit 31, an assessment unit 32 and a switching unit 33. All or some of the units are functional modules driven by a computer program operating on the processor 23, for example. Alternatively, all or some of the units of the processor 23 may be specialized computing circuits in the processor 23.

Figure 5:
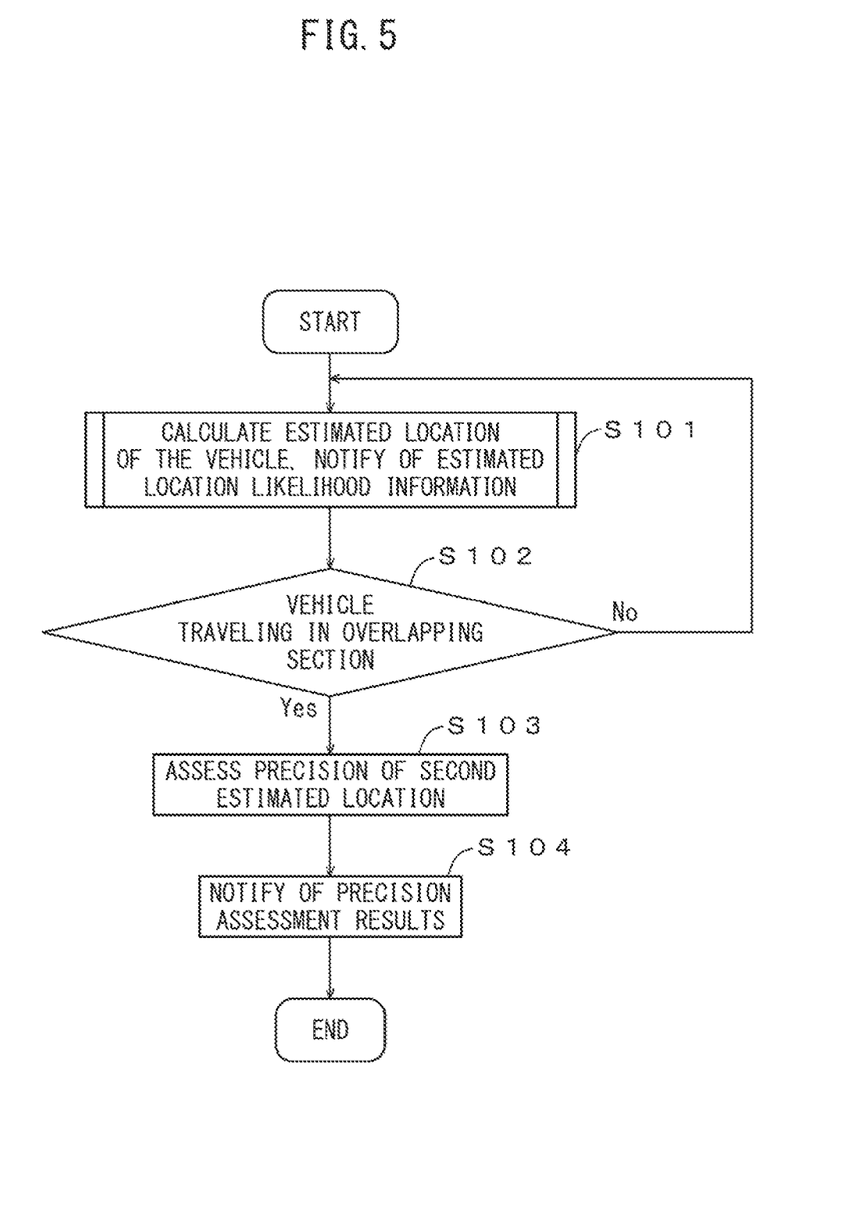
FIG. 5 is an operation flow chart of a processor of a location estimating device for location estimation processing according to the first embodiment.

FIG. 5 is an operation flow chart of the processor 23 of the location estimating device 18, for location estimation processing according to the First embodiment. First, the location calculating unit 31 of the processor 23 uses the camera image, as an example of positional information representing the location of the vehicle 10, and map data, to calculate the estimated location of the vehicle and the estimated location likelihood information, and notifies the assessment unit 32 of the estimated location likelihood information (step S101). The estimated location of the vehicle 10 is represented by a coordinate in the traveling direction of the vehicle 10 (hereunder also referred to as "vertical coordinate) and a coordinate in the direction perpendicular to the traveling direction of the vehicle 10 (hereunder also referred to as "horizontal coordinate"). When the map information read from the map data storage device 13 increases from one to two items, the location calculating unit 31 reads in the existing map information as the first map data and reads in the additional map information as second map data. When the previous estimated location of the vehicle 10 is included in the region represented in the first map data, the location calculating unit 31 uses the camera image and the first map data to calculate the first estimated location of the vehicle and the first estimated location likelihood information. When the previous estimated location of the vehicle 10 is included in the region represented in the second map data, the location calculating unit 31 uses the camera image and the second map data to calculate the second estimated location of the vehicle and the second estimated location likelihood information. The location calculating unit 31 notifies the assessment unit 32 of the second estimated location likelihood information. Processing by the location calculating unit 31 for calculation of the estimated location of the vehicle 10 and likelihood information will be described below.

The assessment unit 32 of the processor 23 assesses whether or not the vehicle 10 is traveling on the overlapping section from the first section toward the second section of the traveling route (step S102). The assessment unit 32 carries out this assessment processing at a predetermined cycle. When the number of map information items read from the map data storage device 13 is two, the assessment unit 32 assesses that the vehicle 10 is traveling in the overlapping section from the first section toward the second section of the traveling route.

When the vehicle 10 is traveling in the overlapping section from the first section toward the second section of the traveling route (step S102—Yes), the assessment unit 32 assesses whether or not the precision of the second estimated location of the vehicle 10 calculated by the location calculating unit 31 satisfies the predetermined assessment criterion (step S103). When the second estimated location likelihood information for the vehicle 10 is below a predetermined reference value, the assessment unit 32 assesses that the precision of the second estimated location of the vehicle 10 satisfies the predetermined assessment criterion. Specifically, when the variance of the second estimated location, as an example of second estimated location likelihood information for the vehicle 10, is below a predetermined variance reference value, the assessment unit 32 assesses that the precision of the second estimated location oldie vehicle 10 satisfies the predetermined assessment criterion. For example, the assessment unit 32 may assess that the precision of the second estimated location of the vehicle 10 satisfies the predetermined assessment criterion when the variance of the vertical coordinate is 0.2 m or less and the variance of the horizontal coordinate is 0.1 in or less, for the variance of the second estimated location. When the variance of the second estimated location of the vehicle 10 is below the first variance reference value and the variance in the second estimated traveling direction is below the second variance reference value, the assessment unit 32 may assess that the precision of the second estimated location of the vehicle 10 satisfies the predetermined assessment criterion.

The assessment unit 32 notifies the location calculating unit 31 of the assessment results for the precision of the second estimated location of the vehicle 10 (step S104).

When the vehicle 10 is not traveling in the overlapping section from the first section toward the second section on the traveling route (step S102—No), operation of the processor 23 of the location estimating device 18 for location estimation processing returns to step S101.

Figure 6:
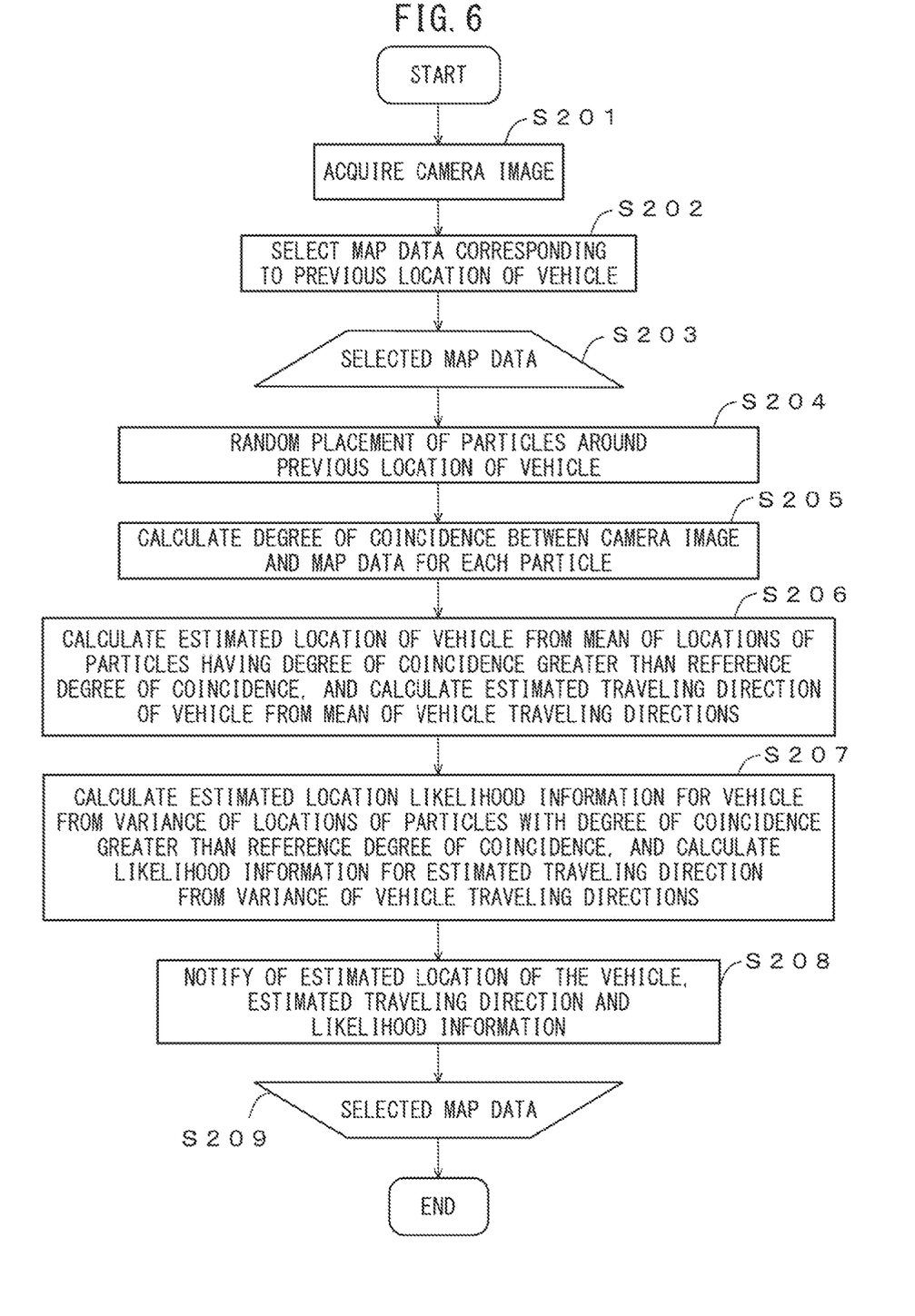
FIG. 6 is an operation flow chart for calculation of the estimated location of a vehicle by a processor of a location estimating device.

Processing whereby the location calculating unit 31 calculates the estimated location of the vehicle 10 and notifies the assessment unit 32 of likelihood information for the estimated location (step S101), will now be explained with reference to FIG. 6. For this embodiment, the location calculating unit 31 uses a particle filter to calculate the estimated location of the vehicle 10 and the estimated location likelihood information. The specific procedure for the particle filter will be described below.

The location calculating unit 31 of the processor 23 acquires a camera image through the in-vehicle network 19 (step S201).

The location calculating unit 31 selects map data corresponding to the previous estimated location of the vehicle 10 (step S202). The location calculating unit 31 of the processor 23 in the location estimating device 18 selects map data containing live previous estimated location of the vehicle 10 from among multiple map data items stored by the map data storage device 13, based on the previous estimated location of the vehicle 10, and the information representing the regions represented in each of the multiple map data items. The location calculating unit 31 sends the map identifying information indicating the selected map data to the map data storage device 13, via the in-vehicle network 19. The location calculating unit 31 reads in map information containing the previous estimated location of the vehicle 10, which was extracted from the map data selected from among the multiple map data items, from the map data storage device 13 via the in-vehicle network 19.

In the example shown in FIG. 1, when the previous estimated location of the vehicle 10 is contained in the region shown as map data M1, the location calculating unit 31 selects the map data M1, and reads in the map information extracted from the map data M1 from the map data storage device 13 via the in-vehicle network 19. When the previous estimated location of the vehicle 10 is contained in the region shown as nap data M2, the location calculating unit 31 selects the map data M2, and reads in the map information extracted from the map data M2 from the map data storage device 13 via the in-vehicle network 19. Thus, when the vehicle 10 is traveling in the overlapping section R12 of the traveling route, the location calculating unit 31 selects the map data M1 and map data M2, and reads in the map information extracted from map data M1 and the map information extracted from map data M2 from the map data storage device 13, via the in-vehicle network 19.

The location calculating unit 31 carries out loop processing from step S204 to step S208 for each of the selected map data items (step S203 to step S209). Specifically, when the map information read in from the map data storage device 13 is a single item, the location calculating unit 31 carries out loop processing from step S204 to step S208 once. When the map information read in from the map data storage device 13 consists of two items, the location calculating unit 31 carries out loop processing from step S204 to step S208 twice.

The location calculating unit 31 places a plurality of particles randomly around the reference location on the map represented by the map information (step S204). One particle corresponds to a randomly set location and traveling direction of the vehicle 10. For example, the location represented by the positioning information is used as the initial value of the reference location, and the previous estimated location of the vehicle 10 is used as the reference location thereafter. The reference location used may also be the point nearest to the previous estimated location of the vehicle 10, among the start points and endpoints of the traffic lane links containing the previous estimated location of the vehicle 10. One traffic lane in the map data is formed by linkage between multiple traffic lane links. The surrounding area of the reference location may be a region with a radius of 30 m centered on the reference location. The locations of the particles are each represented on the map represented in the map information, using a coordinate in the traveling direction of the vehicle 10 (hereunder also referred to simply as "vertical coordinate") and a coordinate in the direction perpendicular to the traveling direction of the vehicle 10 (hereunder also referred to simply as "horizontal coordinate").

The location calculating unit 31 calculates the degree of coincidence between the camera image and the map data for each particle (step S205). Specifically, for each particle, the location calculating unit 31 determines the degree of coincidence between lane marking lines detected from the camera image, and lane marking lines surrounding the vehicle, as observed from the particle location and traveling direction on the map represented by the map information. The processing for detection of the lane marking lines from the camera image is carried out as follows. The location calculating unit 31 detects lane marking lines represented in the camera image, by inputting a matching region for detection of lane marking lines around the vehicle 10, which are formed in the camera image, into an identifier that identifies the lane marking lines in the image. The identifier may use a deep neural network (DNN) that has been trained to detect lane marking lines represented in input images, for example. Processing for determining the degree of coincidence between lane marking lines detected from the camera image, and lane marking lines surrounding the vehicle, as observed from the particle location and traveling direction on the map represented by the map information, may be carried out in the following manner, for example. For each of a plurality of particles, the location calculating unit 31 projects the lane marking lines represented in the map information as observed from the location of the vehicle 10 and its traveling direction, in correspondence with each particle, onto the camera image and calculates the degree of coincidence between lane marking lines detected from the camera image and lane marking lines surrounding the vehicle 10 represented in the map information. Specifically, the location calculating unit 31 uses the location and traveling direction of the vehicle 10 set for each particle as the assumed location and assumed orientation of the vehicle 10. The location calculating unit 31 determines a conversion formula from the world coordinate system to the camera coordinate system which has the location of the camera 11 as the origin and the optical axis direction of the camera 11 as one axial direction, according to the assumed location and assumed orientation. The conversion formula is obtained as a combination between a rotation matrix representing rotation within the coordinate system and a translation vector representing parallel movement within the coordinate system. Using the conversion formula, the location calculating unit 31 converts the coordinates of the lane marking lines on the road around the vehicle 10, which are represented in the world coordinate system and included in the map information, to coordinates in the camera coordinate system. The location calculating unit 31 projects the lane marking lines around the vehicle 10 which are represented in the camera coordinate system, onto the camera image, based on the focal length of the camera 11 as an internal parameter of the camera 11. The location calculating unit 31 also calculates the degree of coincidence between the lane marking lines detected from the camera image and the lane marking lines around the vehicle 10 represented in the map information.

The location calculating unit 31 calculates the estimated location of the vehicle from the mean of the locations of particles having a degree of coincidence greater than a reference degree of coincidence, and calculates the estimated traveling direction of the vehicle from the mean of the traveling directions of the particles having a degree of coincidence greater than the reference degree of coincidence (step S206).

When the map information read in from the map data storage device 13 is a single item, the location calculating unit 31 uses the mean of the particle locations that was calculated using the map information, as the estimated location of the vehicle 10 at the current camera image acquisition time, and uses the mean of the particle traveling directions calculated using the map information, as the estimated traveling direction of the vehicle 10 at the current camera image acquisition time.

When the map information read in from the map data storage device 13 is two items, the location calculating unit 31 uses the estimated location calculated using the map information extracted from the first map data (map data M1 in the example shown in FIG. 1) in the first loop processing as the first estimated location of the vehicle 10 at the current camera image acquisition time, and uses the estimated traveling direction calculated using this map information as the first estimated traveling direction of the vehicle 10 at the current camera image acquisition time. The location calculating unit 31 also uses the estimated location calculated using the map information extracted from the second map data (map data M2 in the example shown in FIG. 1) in the second loop processing, as the second estimated location of the vehicle 10 at the current camera image acquisition time, and uses the estimated traveling direction calculated using this map information as the second estimated traveling direction of the vehicle 10 at the current camera image acquisition time.

The location calculating unit 31 calculates the estimated location likelihood information from the variance of the locations of particles that have a degree of coincidence greater than the reference degree of coincidence, and calculates the likelihood information for the estimated traveling direction from the variance of the traveling directions of particles having a degree of coincidence greater than the reference degree of coincidence (step S207).

When the map information read in from the map data storage device 13 is a single item, the location calculating unit 31 uses the variance of the locations of particles having a degree of coincidence greater than the reference degree of coincidence, calculated using the map information, as the likelihood information for the estimated location of the vehicle 10 at the current camera image acquisition time, and uses the variance of the traveling directions of particles having a degree of coincidence greater than the reference degree of coincidence, calculated using the map information, as the variance in the estimated traveling direction of the vehicle 10 at the current camera image acquisition time. When the variance of the estimated locations of the particle or the variance of the estimated traveling directions exceeds a predetermined variance reference value, or is not within the predetermined variance reference value within a predetermined time (such as 1 minute), the location calculating unit 31 may use the location represented by the latest positioning information as the new reference value, randomly placing a plurality of particles around the new reference location.

When the map information read in from the map data storage device 13 is two items, the location calculating unit 31 uses the estimated location likelihood information calculated using the map information extracted from the first map data (map data M1 in the example shown in FIG. 1) in the first loop processing as the first estimated location likelihood information for the vehicle 10 at the current camera image acquisition time, and uses the estimated traveling direction likelihood information calculated using this map information as the likelihood information for the first estimated traveling direction of the vehicle 10 at the current camera image acquisition time. The location calculating unit 31 also uses the estimated location likelihood information calculated using the map information extracted from the second map data (map data M2 in the example shown in FIG. 1) in the second loop processing as the second estimated location likelihood information for the vehicle 10 at the current camera image acquisition time, and uses the estimated traveling direction likelihood information calculated using this map information as the likelihood information of the second estimated traveling direction for the vehicle 10 at the current camera image acquisition time.

The location calculating unit 31 gives notification of the estimated location of the vehicle and the likelihood information (step S208). When the map information read in from the map data storage device 13 is a single item, the location calculating unit 31 notifies the map data storage device 13, the object detector 16 and the vehicle control device 17 of the estimated location of the vehicle 10, the estimated traveling direction and the camera image acquisition time. When the map information read in from the map data storage device 13 consists of two items, the location calculating unit 31 notifies the assessment unit 32 of the first estimated location, the first estimated traveling direction of the vehicle 10 and the camera image acquisition time, during the first loop processing. During the second loop processing, the location calculating unit 31 notifies the assessment unit 32 of the second estimated location, second estimated traveling direction, second estimated location likelihood information, second estimated traveling direction likelihood information and camera image acquisition time, for the vehicle 10. The processing whereby the location calculating unit 31 uses the camera image and map data to calculate the estimated location of the vehicle 10 will now be explained.

As explained above, the location estimating device calculates a first estimated location of the vehicle using positional information representing the location of the vehicle and first map data overlapping with a first section of a vehicle traveling route, and calculates the second estimated location of the vehicle using positional information and second map data that overlaps with a second section of the traveling route, which is second map data having an overlapping section between the first section and second section. While the vehicle is traveling in the overlapping section from the first section toward the second section, the location estimating device assesses whether or not the precision of the second estimated location satisfies a predetermined assessment criterion. Since the location estimating device thus confirms that the precision of the second estimated location of the vehicle satisfies the predetermined assessment criterion in the overlapping section between the first map data and second map data of the traveling route, it can use the map data after switching to assess whether or not the location of the vehicle can be precisely estimated, before switching the map data. For this embodiment, the location calculating unit 31 does not need to calculate the estimated traveling direction and the estimated traveling direction likelihood information for the vehicle 10.

A second embodiment of the vehicle control system described above will now be described with reference to FIG. 7. The detailed explanation provided for the first embodiment applies for any aspects of the second embodiment that are not explained here. The same reference numerals are also used for corresponding constituent elements.

Figure 7:
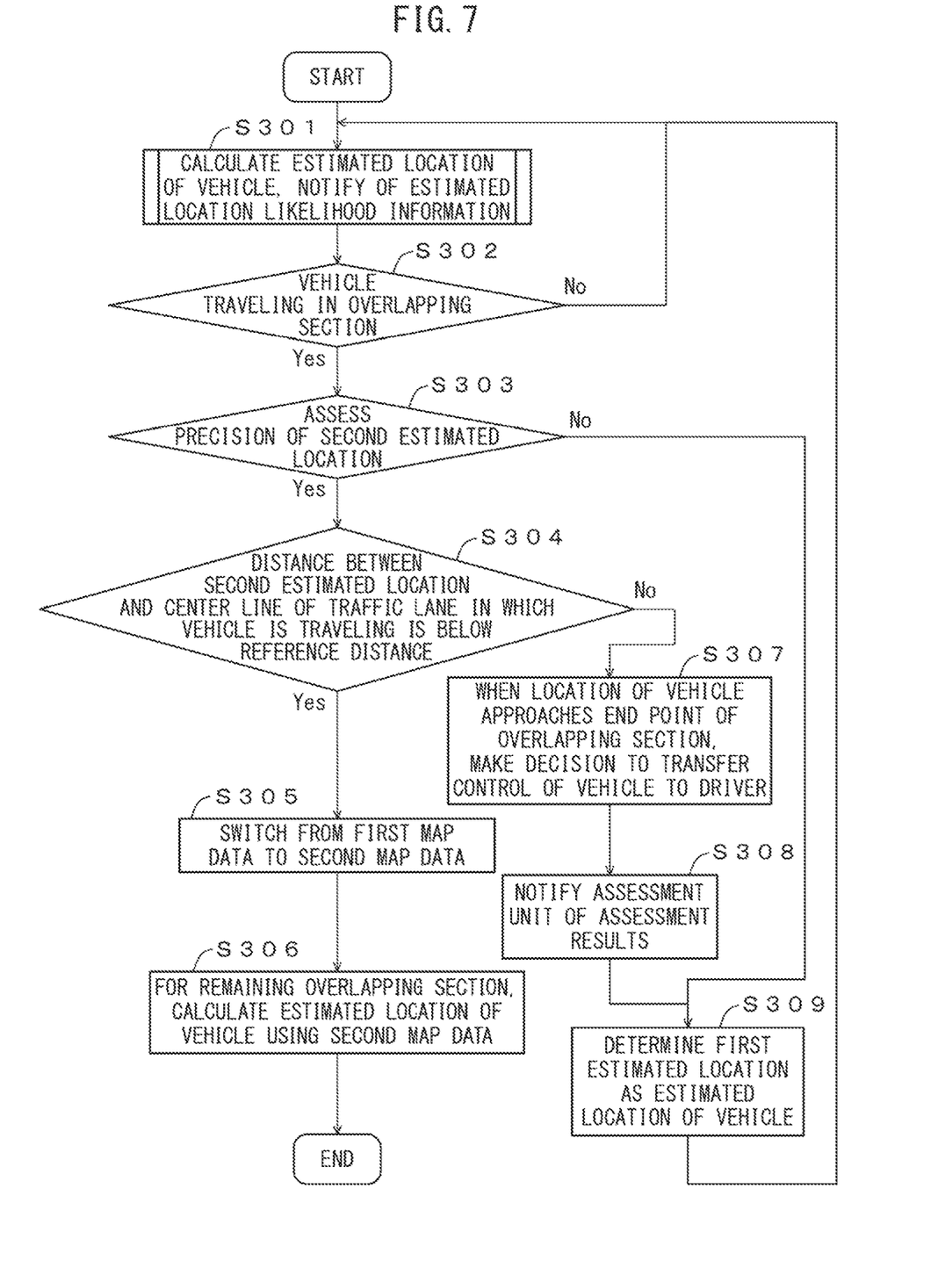
FIG. 7 is an operation flow chart of a processor of a location estimating device for location estimation processing according to the second embodiment.

FIG. 7 is an operation flow chart of the processor 23 of the location estimating device 18, for location estimation processing according to the second embodiment. First, the location calculating unit 31 of the processor 23 uses the camera image, as an example of positional information representing the location of the vehicle 10, and map data, to calculate the estimated location of the vehicle and the estimated location likelihood information, and notifies the assessment unit 32 of the estimated location likelihood information (step S301). The explanation for step S101 applies for operation in this step as well.

The assessment unit 32 of the processor 23 assesses whether or not the vehicle 10 is traveling on the overlapping section from the first section toward the second section of the traveling route (step S302). The explanation for step S102 also applies for operation in this step by the assessment unit 32.

When the vehicle 10 is traveling in the overlapping section from the first section toward the second section of the traveling route (step S302—Yes), the assessment unit 32 assesses whether or not the precision of the second estimated location of the vehicle 10 calculated by the location calculating unit 31 satisfies the predetermined assessment criterion (step S303). The explanation for step S103 applies for operation in this step as well. When the variance of the second estimated location, as an example of second estimated location likelihood information for the vehicle 10, is below a predetermined variance reference value, the assessment unit 32 assesses that the precision of the second estimated location of the vehicle 10 satisfies the predetermined assessment criterion (step S303—Yes). The assessment unit 32 notifies the switching unit 33 of the second estimated location of the vehicle 10, the second estimated traveling direction and the camera image acquisition time. The assessment unit 32 also notifies the switching unit 33 of the first estimated location of the vehicle 10, the first estimated traveling direction and the camera image acquisition time, as notified from the location calculating unit 31.

When the precision of the second estimated location of the vehicle 10 satisfies the predetermined assessment criterion, the switching unit 33 of the processor 23 assesses whether or not the distance between the second estimated location of the vehicle 10, calculated by the location calculating unit 31 using the camera image and the second map data, and the center line of the traffic lane in which the vehicle 10 is traveling in the second map data, is below a reference distance (step S304). The switching unit 33 refers to the map information extracted from the map data M2, as an example of the second map data, and assesses whether or not the distance between the second estimated location and the center line of the traffic lane where the second estimated location is located, is below the reference distance. The reference distance may be 2 m, for example. If the distance between the second estimated location and the center line of the traffic lane in which the second estimated location is estimated to be located is below the reference distance, then it can be assumed that the traffic lane in which the vehicle 10 is traveling has been accurately estimated using the second estimated location, thus allowing confirmation that the second estimated location is reasonably correct.

When the distance between the second estimated location and the center line of the traffic lane in which the vehicle 10 is traveling in the second map data is below the reference distance (step S304—Yes), the switching unit 33 causes the location calculating unit 31 to switch the map data used for calculation of the estimated location of the vehicle 10 from the first map data to the second map data (step S305). The switching unit 33 notifies the location calculating unit 31 of a switching request for switching of the map data used for calculation of the estimated location of the vehicle 10 from the map data M1, as an example of the first map data, to the map data M2, as an example of the second map data.

For the remainder of the overlapping section of the traveling route, the location calculating unit 31 that has been notified of a switching request stops reading in the map data M1 and reads in only the map data M2. Since the map information read in from the map data storage device 13 is only a single item, the location calculating unit 31 uses the map data M2 to calculate the estimated location of the vehicle 10, the estimated location variance, the estimated traveling direction and the estimated traveling direction variance for the remainder of the overlapping section of the traveling route (step S306). The location calculating unit 31 notifies the map data storage device 13, the object detector 16 and the vehicle control device 17 of the estimated location of the vehicle 10, estimated traveling direction and camera image acquisition time, each time the estimated location of the vehicle 10 and estimated traveling direction are calculated. After the vehicle 10 has passed through the overlapping section of the traveling route and exited from the region of the map data M1, operation of the processor 23 of the location estimating device 18 for location estimation processing returns to step S301.

When the distance between the second estimated location and the center line of the traffic lane in which the vehicle 10 is traveling in the second map data is not below the reference distance (step S304—No), the switching unit 33 does not notify the location calculating unit 31 of a switching request for switching the map data used for calculation of the estimated location of the vehicle 10 from the first map data to the second map data. The switching unit 33 also assesses whether or not the first estimated location of the vehicle 10 is approaching the end point of the overlapping section of the traveling route (location P4 in the example shown in FIG. 1). When the first estimated location of the vehicle 10 is approaching the end point of the overlapping section of the traveling route, the switching unit 33 makes the decision to transfer control of the vehicle 10 to the driver (step S307). Specifically, when the vehicle 10 is expected to reach the end point of the overlapping section of the traveling route at a predetermined time (such as 30 seconds), or has reached the predetermined distance (such as 2 km), the switching unit 33 assesses that the estimated location of the vehicle 10 is approaching the end point of the overlapping section of the traveling route. Based on the first estimated location, the end point of the overlapping section and the nearest mean vehicle speed, the switching unit 33 may estimate the time required for the vehicle 10 to reach the end point of the overlapping section, or it may assess that the vehicle 10 has reached the predetermined distance from the endpoint of the overlapping section. The switching unit 33 then notifies the vehicle control device 17 of a request to transfer control of the vehicle 10 to the driver. After having notified the driver through the UI 15 that control of the vehicle 10 will be transferred to the driver, the vehicle control device 17 transfers control of the vehicle 10 to the driver. When the vehicle control device 17 cannot precisely estimate the location of the vehicle 10 using the map data M2, as an example of the second map data, it transfers control of the vehicle 10 to the driver, avoiding continued control of the vehicle 10 in a state where the location of the vehicle 10 cannot be precisely estimated. The switching unit 33 then notifies the assessment unit 32 of the assessment results indicating that the distance to the center line of the traffic lane in which the vehicle 10 is traveling in the second map data is not below the reference distance (step S308).

When notification has been given of the assessment results by the switching unit 33 (step S308) or the precision of the second estimated location does not satisfy the predetermined assessment criterion (step S303—No), the assessment unit 32 of the processor 23 determines that the first estimated location is the estimated location of the vehicle 10, and determines that the first estimated traveling direction is the estimated traveling direction of the vehicle 10 (step S309). The assessment unit 32 also notifies the map data storage device 13, the object detector 16 and the vehicle control device 17 of the estimated location of the vehicle 10, estimated traveling direction and camera image acquisition time. Processing for location estimation from steps S301 to S309 as described above is repeated until the vehicle 10 reaches the destination.

When the vehicle 10 is not traveling in the overlapping section from the first section toward the second section on the traveling route (step S302—No), operation of the processor 23 of the location estimating device 18 for location estimation processing returns to step S301.

As explained above, the location estimating device also has a switching unit that causes the location calculating unit to switch the map data used for calculation of the estimated location of the vehicle from the first map data to the second map data when the precision of the second estimated location satisfies the predetermined assessment criterion. When the precision of the second estimated location satisfies the predetermined assessment criterion, the switching unit assesses whether or not the distance between the second estimated location and the center line of the traffic lane in which the vehicle is traveling in the second map data is below a reference distance, and when the distance is below the reference distance, it causes the location calculating unit to switch the map data used for calculation of the estimated location of the vehicle from the first map data to the second map data, or when the distance is not below the reference distance, it does not cause it to switch the map data used for calculation of the estimated location of the vehicle from the first map data to the second map data. Thus, after confirming that the location of the vehicle can be precisely estimated using the switched map data, the location estimating device can use the switched map data to precisely estimate the location of the vehicle.

The processing in step S304 can also be omitted for the second embodiment. When the processing of step S304 is omitted, and the precision of the second estimated location of the vehicle 10 satisfies the predetermined assessment criterion (step S303—Yes), the processing of steps S305 and S306 are carried out next. When the precision of the second estimated location does not satisfy the predetermined assessment criterion (step S303—No), on the other hand, the assessment unit 32 carries out the processing of step S307 and step S309.

The location estimating device and storage medium that stores a computer program for location estimation of the embodiment described above may incorporate appropriate modifications that are still within the gist of the invention. Moreover, the technical scope of the invention is not limited to this embodiment, and includes the invention and its equivalents as laid out in the Claims.

For example, processing by the assessment unit of the processor to assess whether or not the precision of the second estimated location of the vehicle satisfies the predetermined assessment criterion is not limited to the example described above and may instead use another assessment criterion. When the vehicle is traveling in the overlapping section of the traveling route, for example, the location calculating unit of the processor may determine the first road information representing the road on which the vehicle is traveling and the first lane information representing the location of the traffic lane of the road on which the vehicle is traveling, based on the positional information, the first estimated location of the vehicle calculated using the first map data, and the first map data. For example, the location calculating unit may determine the road zone ID as first road information and the traffic lane ID as first lane information based on the first estimated location and the map information extracted from the first map data. The location calculating unit of the processor may also determine the second road information representing the road on which the vehicle is traveling and the second lane information representing the location of the traffic lane of the road on which the vehicle is traveling, based on the positional information, the second estimated location of the vehicle calculated using the second map data, and the second map data, when the vehicle is traveling in the overlapping section of the traveling route. For example, the location calculating unit may determine the road Zone ID as second road information and the traffic lane ID as second lane information, based on the second estimated location and the map information extracted from the second map data. When the first road information and second road information coincide and the first lane information and second lane information coincide, the assessment unit may assess that the precision of the second estimated location of the vehicle satisfies the predetermined assessment criterion.

In the embodiment described above, the location estimating, device was mounted in the vehicle, but the location estimating device may instead be mounted in a server connected in a communicable manner with the vehicle. In this case, the vehicle sends the server the information used for location estimation processing, including the positioning information, camera image and camera image acquisition time, and the server carries out the location estimation processing, sending the vehicle the first estimated location, the second estimated location and the assessment results.

Moreover, the location calculating unit in the embodiment described above used a camera image as the positional information representing the location of the vehicle, but it may instead use other positional information. For example, the location calculating unit may use information for the distance and orientation to objects surrounding the vehicle, measured by LiDAR, as the positional information.

In a vehicle control system in which the location estimating device is mounted, the automatic control level for operation of the vehicle by automatic control will differ depending on the amount of information in the map data used for estimation of the location of the vehicle in such cases, when the vehicle control system calculates the estimated location of the vehicle using map data with sufficient information for road features including lane marking lines, the automatic control level may be increased for automatic control of driving, braking and steering operations. When the vehicle control system calculates the estimated location of the vehicle using map data without sufficient information for road features, the automatic control level may be lowered for control of the vehicle to support at least one from among driving, braking, and steering, operations. When the automatic control level is low, for example, the driver may manually operate at least one from among driving, braking and steering operations.

The invention claimed is:

1. A location estimating device comprising; a processor that is configured to:
   obtain positional information of a vehicle including an image of an environment surrounding the vehicle, the positional information representing a location of the vehicle,
   perform an object detection process on the image to detect one or more objects included in the image,
   calculate a first estimated location of the vehicle based on a comparison of the detected one or more objects included in the image with first map data overlapping with a first section of a vehicle traveling route,
   calculate a second estimated location of the vehicle based on a comparison of the detected one or more objects included in the image with second map data that overlaps with a second section of the vehicle traveling route, the first section and the second section having an overlapping section,
   based on a determination the vehicle is traveling in the overlapping section from the first section toward the second section, assess whether a precision of the second estimated location satisfies a predetermined assessment criterion,
   based on the determination the precision of the second estimated location satisfies the predetermined assessment criterion, determine whether a distance between the second estimated location and at least one object in the detected one or more objects is less than a reference distance, and
   switch the map data used for calculation of the estimated location of the vehicle from the first map data to the second map data based on the determination the distance between the second estimated location and at least one object in the detected one or more objects is less than the reference distance such that the vehicle is automatically controlled according to the second map data.

2. The location estimating device according to claim 1, wherein the processor is configured to:
   determine a mean and a variance of the location of the vehicle estimated using a particle filter based on the determination the vehicle is traveling in the overlapping section,
   obtain the mean of the location of the vehicle as the second estimated location, and
   assess that the precision of the second estimated location satisfies the predetermined assessment criterion based on a determination the variance of the location of the vehicle is below a first reference value.

3. The location estimating device according to claim 2, wherein the processor is further configured to:
   determine a variance of the traveling direction of the vehicle estimated using the particle filter based on the determination the vehicle is traveling in the overlapping section, and
   assess that the precision of the second estimated location satisfies the predetermined assessment criterion based on a determination the variance of the location of the vehicle is below the first reference value and the variance of the traveling direction of the vehicle is below a second reference value.

4. The location estimating device according to claim 1, wherein the processor is further configured to:
   determine first road information representing a road on which the vehicle is traveling and first lane information representing a location of a traffic lane of the road on which the vehicle is traveling, based on the positional information, the first estimated location and the first map data section,
   based on the determination the vehicle is traveling in the overlapping section, determine second road information representing the road on which the vehicle is traveling and second lane information representing the location of the traffic lane of the road on which the vehicle is traveling, based on the positional information, the second estimated location and the second map data,
   assess that the precision of the estimated location of the vehicle satisfies the predetermined assessment criterion based on a determination the first road information and the second road information coincide and the first lane information and the second lane information coincide.

5. The location estimating device according to claim 1, wherein the processor is further configured to:
   determine that the first estimated location is the estimated location of the vehicle based on a determination the precision of the second estimated location does not satisfy the predetermined assessment.

6. The location estimating device according to claim 5, wherein the at least one object is a center line of a traffic lane in which the vehicle is traveling in the second map data.

7. A non-transitory computer-readable storage medium that stores a computer program for location estimation, which when executed by a processor cause the processor to:
obtain positional information of a vehicle including an image of an environment surrounding the vehicle, the positional information representing a location of the vehicle;
perform an object detection process on the image to detect one or more objects included in the image;
calculate a first estimated location of the vehicle based on a comparison of the detected one or more objects included in the image with first map data overlapping with a first section of a vehicle traveling route;
calculate a second estimated location of the vehicle based on a comparison of the detected one or more objects included in the image with second map data that overlaps with a second section of the vehicle traveling route, the first section and the second section having an overlapping section;
based on a determination the vehicle is traveling in the overlapping section from the first section toward the second section, assess whether a precision of the second estimated location satisfies a predetermined assessment criterion,
based on the determination the precision of the second estimated location satisfies the predetermined assessment criterion, determine whether a distance between the second estimated location and at least one object in the detected one or more objects is less than a reference distance; and
switch the map data used for calculation of the estimated location of the vehicle from the first map data to the second map data based on the determination the distance between the second estimated location and at least one object in the detected one or more objects is less than the reference distance such that the vehicle is automatically controlled according to the second map data.

8. A location estimating method performed by at least one processor of a location estimating device, the method comprising:
obtaining positional information of a vehicle including an image of an environment surrounding the vehicle, the positional information representing a location of the vehicle; performing an object detection process on the image to detect one or more objects included in the image;
calculating a first estimated location of the vehicle based on a comparison of the detected one or more objects included in the image with first map data overlapping with a first section of a vehicle traveling route;
calculating a second estimated location of the vehicle based on a comparison of the detected one or more objects included in the image with second map data that overlaps with a second section of the vehicle traveling route, the first section and the second section having an overlapping section;
based on a determination the vehicle is traveling in the overlapping section from the first section toward the second section, assessing whether a precision of the second estimated location satisfies a predetermined assessment criterion when the vehicle is traveling in the overlapping section from the first section toward the second section;
based on the determination the precision of the second estimated location satisfies the predetermined assessment criterion, determine whether a distance between the second estimated location and at least one object in the detected one or more objects is less than a reference distance; and
switch the map data used for calculation of the estimated location of the vehicle from the first map data to the second map data based on the determination the distance between the second estimated location and at least one object in the detected one or more objects is less than the reference distance such that the vehicle is automatically controlled according to the second map data.

* * * * *